United States Patent
Tang et al.

(10) Patent No.: US 11,374,969 B2
(45) Date of Patent: Jun. 28, 2022

(54) QUANTITATIVE SELECTION OF SECURE ACCESS POLICIES FOR EDGE COMPUTING SYSTEM

(71) Applicant: UNIVERSITY OF ELECTRONIC SCIENCE AND TECHNOLOGY OF CHINA, Chengdu (CN)

(72) Inventors: Jie Tang, Chengdu (CN); Hong Wen, Chengdu (CN); Huanhuan Song, Chengdu (CN); Feiyi Xie, Chengdu (CN); Yi Chen, Chengdu (CN)

(73) Assignee: UNIVERSITY OF ELECTRONIC SCIENCE AND TECHNOLOGY OF CHINA, Chengdu (CN)

(*) Notice: Subject to any disclaimer, the term of this patent is extended or adjusted under 35 U.S.C. 154(b) by 0 days.

(21) Appl. No.: 17/298,610

(22) PCT Filed: Dec. 27, 2019

(86) PCT No.: PCT/CN2019/129463
§ 371 (c)(1),
(2) Date: May 31, 2021

(87) PCT Pub. No.: WO2021/004033
PCT Pub. Date: Jan. 14, 2021

(65) Prior Publication Data
US 2021/0392163 A1 Dec. 16, 2021

(30) Foreign Application Priority Data
Jul. 11, 2019 (CN) .......................... 201910622251.6

(51) Int. Cl.
*H04L 9/40* (2022.01)
*G06N 3/04* (2006.01)

(52) U.S. Cl.
CPC ....... *H04L 63/1466* (2013.01); *G06N 3/0454* (2013.01); *H04L 63/1416* (2013.01); *H04L 63/20* (2013.01)

(58) Field of Classification Search
CPC . H04L 63/1466; H04L 63/1416; H04L 63/20; G06N 3/0454
See application file for complete search history.

(56) References Cited

U.S. PATENT DOCUMENTS 10,691,796 B1 * 6/2020 Stolte ................. G06Q 10/0635
10,848,515 B1 * 11/2020 Pokhrel ............... H04L 63/1416
(Continued)

FOREIGN PATENT DOCUMENTS

CN    101488168 A    7/2009
CN    101674302 A    3/2010
(Continued)

OTHER PUBLICATIONS

Guang Zeng, et al., Comprehensive measure method for node importance based on data field model in network, Computer Engineering and Design, 2015, pp. 76-81, vol. 36 No.1.
(Continued)

*Primary Examiner* — Joseph P Hirl
*Assistant Examiner* — Stephen T Gundry
(74) *Attorney, Agent, or Firm* — Bayramoglu Law Offices LLC

(57) ABSTRACT

A quantitative method for the security access strategy selection of the edge computing terminals includes the following steps: S1. Quantifying and ranking the security risks according to the terminals and data application requirements under the edge computing system. S1. Quantifying and ranking the security risks according to the terminals and data application requirements under the edge computing system. S2. Calculating the security quantification value of terminal and data (Continued)

application. S3. Giving the weight coefficients for the security risk protection of the security access strategies for the terminal and data in the edge computing side. S4. Give the corresponding value of each security strategy to the corresponding terminal and data security protection. S5. Select the corresponding algorithm according to the data set in S4 to select the security strategies.

3 Claims, 3 Drawing Sheets

(56) References Cited

U.S. PATENT DOCUMENTS

| | | | | |
|---|---|---|---|---|
| 2009/0077666 | A1* | 3/2009 | Chen | G06F 21/577 726/25 |
| 2009/0240563 | A1 | 9/2009 | Sacks et al. | |
| 2010/0275263 | A1* | 10/2010 | Bennett | G06F 21/577 726/25 |
| 2011/0252479 | A1* | 10/2011 | Beresnevichiene | G06F 21/577 726/25 |
| 2013/0238509 | A1 | 9/2013 | Muchow | |
| 2014/0108089 | A1* | 4/2014 | Abercrombie | G06Q 10/0635 705/7.28 |
| 2018/0027006 | A1* | 1/2018 | Zimmermann | H04L 63/0245 726/11 |
| 2019/0260764 | A1* | 8/2019 | Humphrey | H04L 63/1425 |
| 2019/0394243 | A1* | 12/2019 | Wiig | H04L 63/0876 |
| 2020/0014702 | A1* | 1/2020 | Dasgupta | H04L 63/1416 |
| 2020/0177617 | A1* | 6/2020 | Hadar | G06F 11/0793 |
| 2020/0177618 | A1* | 6/2020 | Hassanzadeh | H04L 63/1441 |
| 2020/0252423 | A1* | 8/2020 | Hogg | G06N 20/20 |
| 2020/0296137 | A1* | 9/2020 | Crabtree | H04L 63/1425 |
| 2020/0296138 | A1* | 9/2020 | Crabtree | H04L 63/1425 |
| 2020/0351298 | A1* | 11/2020 | Paturi | G06N 5/04 |
| 2021/0297443 | A1* | 9/2021 | Crabtree | H04L 63/123 |

FOREIGN PATENT DOCUMENTS

| | | |
|---|---|---|
| CN | 102263410 A | 11/2011 |
| CN | 103023889 A | 4/2013 |
| CN | 104657915 A | 5/2015 |
| CN | 106529795 A | 3/2017 |
| CN | 110138627 A | 8/2019 |

OTHER PUBLICATIONS

Wen-Jing Hou, et al., Intelligent Terminal Security Risk Classification Based on BP Neural Network, Communications Technology, 2018, pp. 2455-2458, vol. 51 No. 10.

* cited by examiner

QUANTITATIVE SELECTION OF SECURE ACCESS POLICIES FOR EDGE COMPUTING SYSTEM

CROSS REFERENCE TO THE RELATED APPLICATIONS

This application is the national stage entry of International Application No. PCT/CN2019/129463, filed on Dec. 27, 2019, which is based upon and claims priority to Chinese Patent Application No. 201910622251.6 filed on Jul. 11, 2019, the entire contents of which are incorporated herein by reference.

TECHNICAL FIELD

The invention is regarding to the field of mobile edge computing, in particular to an edge computing method and the security protection in the Internet of Things

BACKGROUND

In order to meet various applications with low delay requirements, such as industrial control, unmanned driving, virtual reality, etc. The new network architecture has emerged as edge computing. Edge computing devices are introduced between the cloud computing servers and terminals. Compared with cloud computing, edge computing brings nearby data processing, reduces network transmission and delay, and thus improves security. It is called "the last kilometer of artificial intelligence". In the meantime, the security of edge computing system becomes the key issue to the applications. In the future, a large number of heterogeneous terminals will access to the edge computing servers, and it has different application requirements. With the computing resource support at the edge, it can adopt a variety of secure access policies to support the secure access of heterogeneous terminal and data security access. Therefore, this patent proposed a method to quantify the security risks and threats for the terminal and data, which selects the appropriate algorithm, and based on the objective quantitative standards to choose the terminal security access strategy to achieve maximum optimization of system security performance at the edge computing system.

SUMMARY

The present invention is to solve technical problems, which are described below Quantifying the security risks and threats for the terminal and data, based on the security risk, system complexity, and quantifying terminal and data security risks and threats, and selecting the appropriate algorithm to choose the terminal security access strategies based on the objective quantitative standards, which achieves maximum optimization of system security at the edge computing system.

The technical solution adopted by the invention to solve the above technical problems is to make full use of the computing ability of the edge computing devices, and select the security access strategies of edge computing side by adopting AHP (Analytic Hierarchy Process) and machine learning algorithm to realize the maximum optimization of the security performance of edge computing system.

A quantitative selection method of security access strategies for edge computing side, which includes the following steps:

1) According to the security risks and application requirements of terminal and data application under the edge computing system, the security risks are quantified as:

TABLE 1

Quantified the security risks of terminal and data application in edge computing system

| | QUANTIFICATION VALUE OF SECURITY RISK | | | | |
|---|---|---|---|---|---|
| | 0-2 | 2-4 | 4-6 | 6-8 | 8-10 |
| SYSTEM RISK | VERY LOW | LOW | MEDIUM | HIGH | VERY HIGH |
| DESTRUCTIVE FORCE | VERY WEAK | WEAK | MEDIUM | STRONG | VERY STRONG |
| VULNERABILITY | VERY LOW | LOW | MEDIUM | HIGH | VERY HIGH | as shown in Table 1.

For every possible attack on the terminals, (for example: permission attack, data storage and encryption attack, loophole threat and remote control, etc.), the security risks of terminals and data are quantified from three aspects as the system risk, destructive force, and vulnerability, respectively. As is shown in FIG. 1, the quantification value of the security risk for each item can be determined by experience, or by the expert assessment. When there are s kinds of threats, the evaluation matrix is written as:

$$A = \begin{Bmatrix} a_1^1 & a_2^1 & a_3^1 \\ a_1^2 & a_2^2 & a_3^2 \\ \vdots & \vdots & \vdots \\ a_1^s & a_2^s & a_3^s \end{Bmatrix} \quad (1)$$

Where t=1, 2, 3, v=1, 2, . . . s, and $a_t^v$ is the quantification value of the security risk of a terminal under an attack, which is referred to Table 1.

2) The quantification value of the i-th security risk $W_i$ on the k-th terminal is:

$$W_i = \{w_1^i, w_2^i, \cdots w_s^i\}(i = 1, 2, \cdots k) \quad (2)$$

Where $$w_v^i = \frac{\sum_{t=1}^{3} a_t^v}{\sum_{v=1}^{s} \sum_{t=1}^{3} a_t^v}(i = 1, 2, \cdots k; v = 1, 2, \cdots, s)$$

3) There are p security strategies on the edge side, the evaluation matrix is:

$$B = \begin{Bmatrix} b_1^1 & b_2^1 & \ldots & b_p^1 \\ b_1^2 & b_2^2 & \ldots & b_p^2 \\ \vdots & \vdots & \ddots & \vdots \\ b_1^s & b_2^s & \ldots & b_p^s \end{Bmatrix} \quad (3)$$

4) The security protection quantification value after applying the p security strategies to the i-th terminal or data is:

$$Z^i = W_i \cdot B = \{Z_1^i Z_2^i \ldots Z_j^i \ldots Z_p^i\}, (i=1,2,\ldots k; j=1,2,\ldots p) \quad (4)$$

Where $Z_j^i$ is a quantification value of security protection after applying the j-th security strategy to the i-th terminal or data;

5) If only a single security strategy is required, it is selected based on the maximum value of $Z_j^i$, (i=1, 2, ... k; j=1, 2, ... p); when a combination of two or more security strategies are required, the machine learning method and a deep learning algorithm are used to select the strategies based on the quantification value in (4).

The benefits of the invention are described below:

(1) The method realizes the optimization of the security performance of the edge computing system by selecting the security access strategy of the edge computing terminal through the objective quantified standard.

(2) Through the quantitative relationship between the security strategies and the risks of terminal or data application, the method gives the comprehensive assessment by considering both security and complexity, so as to obtain the most economical security strategies under the security requirements.

DETAILED DESCRIPTION OF THE EMBODIMENTS

The following content gives more detailed description of the technical details of the invention in combination with the method of BP neural network, but the protection scope of the invention is not limited to the following description.

According to the security risks and application requirements of terminal and data application under the edge computing system, the security risks are quantified as:

TABLE 1

Quantified the security risks of terminal and data application in edge computing system

| | QUANTIFICATION VALUE OF SECURITY RISK | | | | |
|---|---|---|---|---|---|
| | 0-2 | 2-4 | 4-6 | 6-8 | 8-10 |
| SYSTEM RISK | VERY LOW | LOW | MEDIUM | HIGH | VERY HIGH |
| DESTRUCTIVE FORCE | VERY WEAK | WEAK | MEDIUM | STRONG | VERY STRONG |
| VULNERABILITY | VERY LOW | LOW | MEDIUM | HIGH | VERY HIGH | as shown in Table 1.

Figure 1:
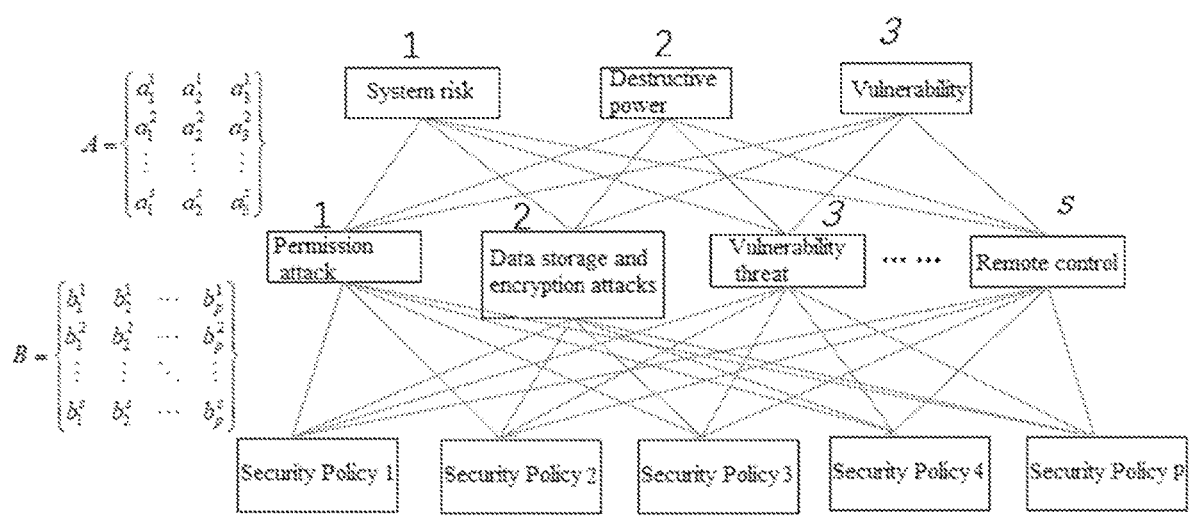
FIG. 1 illustrates the relationship between the security strategies and security risks of edge computing terminal or data application.

For every possible attack on the terminals, (for example: permission attack, data storage and encryption attack, loophole threat and remote control, etc.), the security risks of terminals and data are quantified from three aspects as the system risk, destructive force, and vulnerability, respectively. As is shown in FIG. 1, the quantification value of the security risk for each item can be determined by experience, or by the expert assessment.

S1. When there are s kinds of threats, the evaluation matrix is written as:

$$A = \begin{Bmatrix} a_1^1 & a_2^1 & a_3^1 \\ a_1^2 & a_2^2 & a_3^2 \\ \vdots & \vdots & \vdots \\ a_1^s & a_2^s & a_3^s \end{Bmatrix} \quad (1)$$

Where t=1, 2, 3, v=1, 2, ... s, and $a_t^v$ is the quantification value of the security risk of a terminal under an attack, which is referred to Table 1.

S2. The quantification value of the i-th security risk $W_i$ on the k-th terminal is:

$$W_i = \{w_1^i, w_2^i, \cdots w_s^i\}(i = 1, 2, \cdots k) \quad (2)$$

Where $$w_v^i = \frac{\sum_{t=1}^{3} a_t^v}{\sum_{v=1}^{s}\sum_{t=1}^{3} a_t^v}(i = 1, 2, \cdots k; v = 1, 2, \cdots, s)$$

S3. There are p security strategies on the edge side, the evaluation matrix is:

$$B = \begin{Bmatrix} b_1^1 & b_2^1 & \ldots & b_p^1 \\ b_1^2 & b_2^2 & \ldots & b_p^2 \\ \vdots & \vdots & \ddots & \vdots \\ b_1^s & b_2^s & \ldots & b_p^s \end{Bmatrix} \quad (3)$$

S4. The security protection quantification value after applying the p security strategies to the i-th terminal or data is:

$$Z^i = W_i \cdot B = \{Z_1^i \ Z_2^i \ldots Z_j^i \ldots Z_p^i\}, (i=1,2,\ldots k; j=1, 2, \ldots p) \quad (4)$$

Where $Z_j^i$ is a quantification value of security protection after applying the j-th security strategy to the i-th terminal or data;

S5. If only a single security strategy is required, it is selected based on the maximum value of $Z_j^i$, (i=1, 2, ... k; j=1, 2, ... p); when a combination of two or more security strategies are required, the machine learning method and a deep learning algorithm are used to select the strategies based on the quantification value in (4).

S5.1: k terminals (k=m+n) have p security strategies, and each security strategy is expressed as $y_j^i$ (i=1, 2, ... k; j=1, 2, ... p). Then, the security quantification value in formula (4) and the security strategy $y_j^i$ are combined into a data set $D=\{(Z_1, y_1), (Z_2, y_2), \ldots, (Z_k, y_k)\}$.

S5.2 Divide the data set D, and take the first m items of data set D as the training set T, and the next n items as the test set S, where k=m+n. That means, the training set $T=\{(Z_1, y_1), Z_2, y_2), \ldots, (Z_m, y_m)\}$, the proportion of the data set is $$\frac{m}{m+n} * 100\%,$$

the test set $CHE=\{(Z_{m+1}, y_{m+1}), (Z_{m+2}, y_{m+2}), \ldots, (Z_{m+n}, y_{m+m})\}$, the proportion of the data set is $$\frac{m}{m+n} * 100\%.$$

Figure 2:
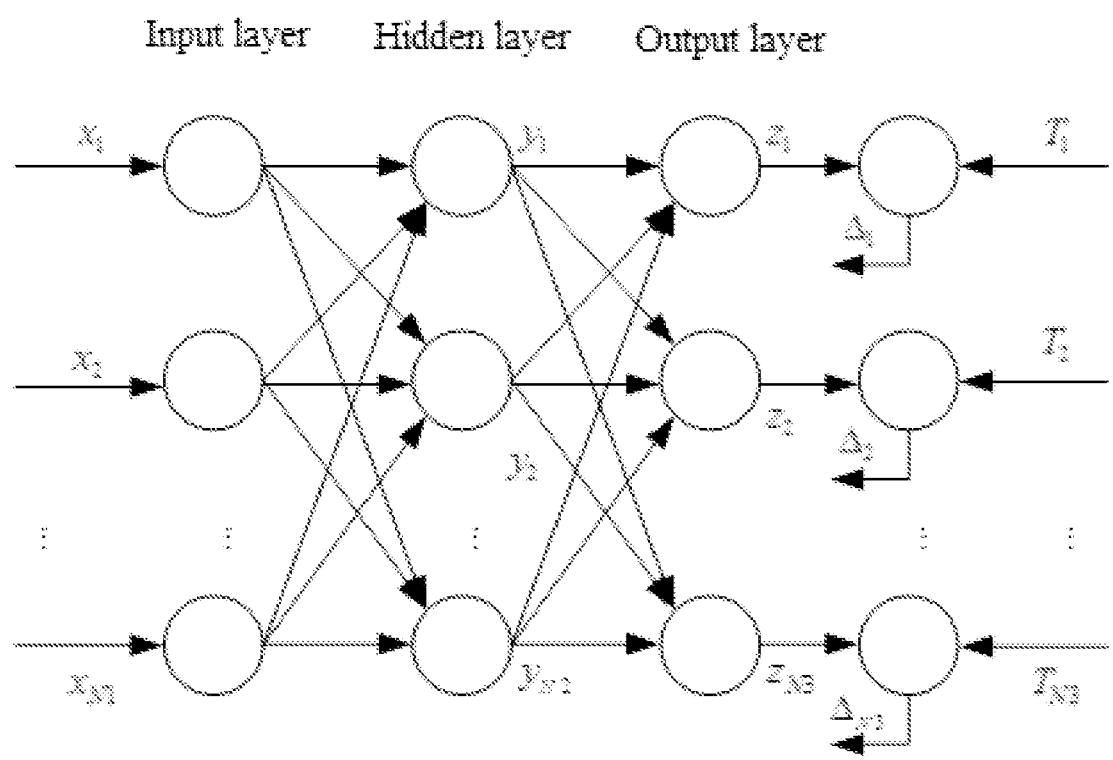
FIG. 2 contains the BP neural network structure of the hidden layer.

S5.3 Determine the BP neural network structure. The BP neural network includes the number of hidden layers, and the number of nodes in each hidden layer, which is shown in FIG. 2.

Figure 3:
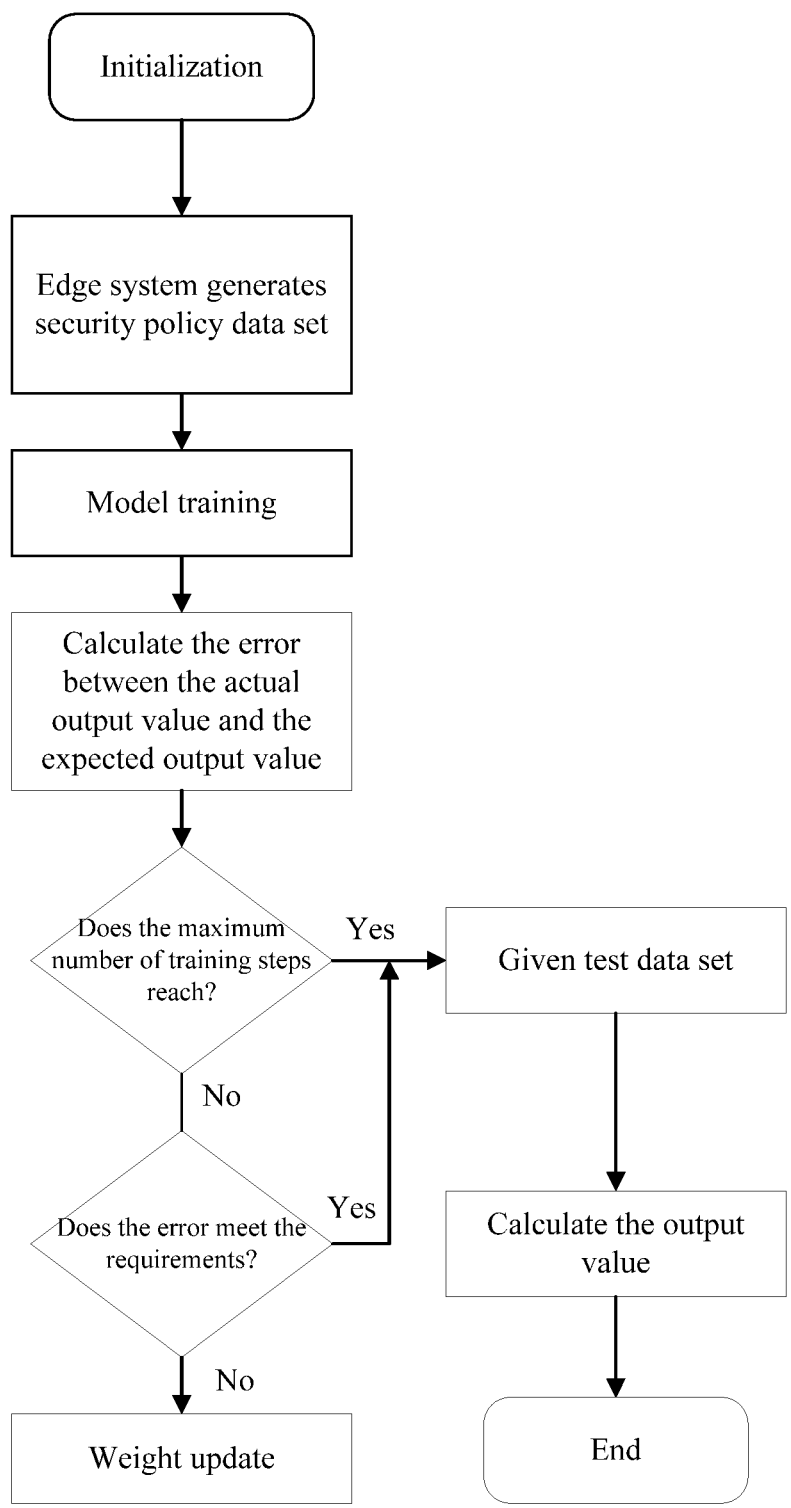
FIG. 3 is flow chart of BP neural network training and testing.

S5.4 Use the training set T={$(Z_1, y_1), (Z_2, y_2), \ldots, (Z_m, y_m)$} to train the BP neural network. The training is shown in FIG. 3. Stop the training when the error is small enough.

S5.5 After training input the test set CHE={$(Z_{m+1}, y_{m+1}), (Z_{m+2}, y_{m+2}), \ldots, (Z_{m+m}, y_{m+n})$} into the BP neural network to obtain the corresponding security strategies.

What is claimed is:

1. A cooperative computational method for an edge computing system, comprising the following steps:
  1) according to security risks and application requirements of a terminal and a data application under the edge computing system, quantifying the security risks as shown in table 1:

TABLE 1 quantifying the security risks of the terminal and the data application in the edge computing system

| | quantification value of security risks | | | | |
|---|---|---|---|---|---|
| | 0-2 | 2-4 | 4-6 | 6-8 | 8-10 |
| system risk | very low | low | medium | high | very high |
| destructive force | very weak | weak | medium | strong | very strong |
| vulnerability | very low | low | medium | high | very high | wherein,
for an attack on the terminal selected from the group consisting of a permission attack, a data storage and encryption attack, a loophole threat and a remote control, the security risks of the terminal and the data application are quantified from three aspects of the system risks, the destructive force, and the vulnerability; a quantification value of the security risks for each of the attack is determined by experience, or by expert assessment, and in response to s kinds of threats, an evaluation matrix is written as:

$$A = \begin{Bmatrix} a_1^1 & a_2^1 & a_3^1 \\ a_1^2 & a_2^2 & a_3^2 \\ \vdots & \vdots & \vdots \\ a_1^s & a_2^s & a_3^s \end{Bmatrix}, \quad (1)$$

wherein with t=1, 2, 3 and v=1, 2, ..., s, $a_t^v$ is the quantification value of the security risks of the terminal under the attack, and is determined according to Table 1;

2) calculating the quantification value $W_i$ of the security risks on a i-th terminal of k terminals or the data application as follows:

$$W_i = \{w_1^i, w_2^i, \cdots w_s^i\}(i = 1, 2, \cdots k) \quad (2)$$

wherein $$w_v^j = \frac{\sum_{t=1}^{3} a_t^v}{\sum_{v=1}^{s}\sum_{t=1}^{3} a_t^v}(i = 1, 2, \cdots k; v = 1, 2, \cdots, s),$$

3) according to p security strategies on an edge side, calculating the evaluation matrix as follows:

$$B = \begin{Bmatrix} b_1^1 & b_2^1 & \ldots & b_p^1 \\ b_1^2 & b_2^2 & \ldots & b_p^2 \\ \vdots & \vdots & \ddots & \vdots \\ b_1^s & b_2^s & \ldots & b_p^s \end{Bmatrix}; \quad (3)$$

4) after applying the p security strategies to the i-th terminal or the data application, calculating a security protection quantification value as follows:

$$Z^i = W_i \cdot B = \{Z_1^i \ Z_2^i \ldots Z_j^i \ldots Z_p^i\}, (i=1,2,\ldots k; j=1, 2, \ldots p) \quad (4),$$

wherein $Z_j^i$ is the security protection quantification value after applying a j-th security strategy to the i-th terminal or the data application;

5) in response to a single security strategy, selecting the single security strategy based on a maximum value of $Z_j^i$, (i=1, 2, ... k; j=1, 2, ... p); and in response to a combination of two or more security strategies, using a machine learning method and a deep learning algorithm to select the combination of two or more security strategies based on the security protection quantification value in Eq. (4).

2. The method of claim 1, wherein a connection between edge computing devices and the terminals is either a wireless connection or a wired connection.

3. The method of claim 1, wherein the security strategies adopted by edge computing devices and the number of the security strategies are determined according to security requirements of the network system.

* * * * *

UNITED STATES PATENT AND TRADEMARK OFFICE
CERTIFICATE OF CORRECTION

| | |
|---|---|
| PATENT NO. | : 11,374,969 B2 |
| APPLICATION NO. | : 17/298610 |
| DATED | : June 28, 2022 |
| INVENTOR(S) | : Jie Tang et al. |

It is certified that error appears in the above-identified patent and that said Letters Patent is hereby corrected as shown below:

On the Title Page

Item (72) Inventors should read as follows:
Jie Tang, Chengdu (CN); Sijing Wang, Chengdu (CN); Hong Wen, Chengdu (CN); Huanhuan Song, Chengdu (CN); Feiyi Xie, Chengdu (CN); Yi Chen, Chengdu (CN).

Page 1 of 1

Signed and Sealed this
Twenty-fifth Day of October, 2022

Katherine Kelly Vidal
*Director of the United States Patent and Trademark Office*